United States Patent [19]

Testa et al.

[11] Patent Number: 5,760,668

[45] Date of Patent: Jun. 2, 1998

[54] MAGNETIC TOOL AND OBJECT HOLDER

[76] Inventors: Joseph F. Testa, 41 Pearl St., Milford, Mass. 01757; Chris C. Camuso, 67 Turner Rd., Holliston, Mass. 01746

[21] Appl. No.: 586,493

[22] Filed: Jan. 16, 1996

[51] Int. Cl.[6] .................. H01F 7/20; A47F 5/00
[52] U.S. Cl. .......... 335/285; 224/183; 248/309.4; 211/DIG. 1; 335/306; 206/350
[58] Field of Search .................. 224/186, 226, 224/250, 901, 904; 206/350, 818; 335/285, 295, 303, 306; 248/309.4; 211/DIG. 1; 43/57.1; 40/124.01, 661.01, 600, 711

[56] References Cited

U.S. PATENT DOCUMENTS

| | | | |
|---|---|---|---|
| 2,565,624 | 8/1951 | Phelon | 335/285 |
| 2,958,019 | 10/1960 | Scholten et al. | 335/285 |
| 3,287,021 | 11/1966 | Herd | 335/285 |
| 3,537,048 | 10/1970 | Spodig | 335/285 |
| 3,827,021 | 7/1974 | Phelon | 335/285 |
| 3,886,508 | 5/1975 | Lavrard | 335/285 |
| 4,451,810 | 5/1984 | Miller | 335/285 |
| 4,826,059 | 5/1989 | Bosch et al. | 224/183 |
| 5,301,822 | 4/1994 | Coleman et al. | 211/70.6 |

*Primary Examiner*—Michael L. Gellner
*Assistant Examiner*—Raymond Barrera
*Attorney, Agent, or Firm*—John P. McGonagle

[57] ABSTRACT

A casing with multiple bar magnets attached to the inner side of a casing back panel. A non-magnetic cover encloses the magnets in the casing and provides a flat surface for engaging tools and other objects. The casing has handles on the casing side panels to permit easy carrying and a means for hanging the casing in a variety of work locations.

5 Claims, 3 Drawing Sheets

MAGNETIC TOOL AND OBJECT HOLDER

BACKGROUND OF THE INVENTION

This invention relates to tool and object holders, and more particularly to an improved magnetic tool and object holder.

When a mechanic or other craftsman misplaces a tool or critical part during work he must interrupt his work until he finds or replaces the tool or part. This is a common occurrence. To help alleviate this problem, tool holders are known in the art. Magnetic tool holders are especially helpful in keep tools or parts containing metal components in a known location.

Prior art magnetic holders are formed usually by setting up a single magnetic dipole within the holder. Where multiple magnets have been used, the magnets were aligned end to end or side by side with each magnetic pole essentially adjacent to poles of opposite polarity. The magnetic fields of the individual magnets interact. The sum effect is that one side of the prior art object holder will be a north pole and the other side a south pole.

Various types of prior art magnetic holders have been proposed in which a single dipole was created. For example in U.S. Pat. No. 361,248, one or more magnetic bars are aligned to form a single dipole via a suspending frame. In the magnetic surface plate of U.S. Pat. No. 3,110,847, bar magnets are aligned on a flat surface with the magnetic poles primarily adjacent opposite poles of adjacent bars. The result is that one end of the surface plate has a north pole and the opposite end a south pole. In the magnetic holder of U.S. Pat. No. 3,195,021, a single U-shaped pole bar is used for the magnetic field. The single magnet creates a single field which although concentrated in some locations would be weaker in other locations due to engagement of a large metal object in another location of the holder. For other single dipole field magnetic object holders, see also U.S. Pat. Nos. 2,176,052 and 3,886,508.

The single magnetic field configuration per object holder is limited in that when a relatively large ferromagnetic object, such as a large pipe wrench, is placed across the pole pieces, magnetic flux is drawn by the pipe wrench away from adjacent portions of the pole pieces with a consequent reduction in flux in such areas. Smaller ferromagnetic objects will not then engage to the adjacent areas or, if already engaged, will fall of the magnetic holder. In addition, the ferromagnetic objects will eventually become magnetized themselves during engagement due to the large single field. When removed the magnetized tool will attract metal chips, brads and other undesirable metal objects making it difficult to use. The above described phenomenon has been described in U.S. Pat. Nos. 2,565,624 and 3,827,021.

In U.S. Pat. No. 2,565,624, the wall mounted magnetic object holder disclosed attempts to reduce flux leakage due to large objects. The method used is to place the magnets behind a semi-circular surface which had notches cut in the face. The notches act to separate the field, hence preventing the single field from being concentrated in a single location on the surface due to a single large ferromagnetic object. This notching method is effective but limited in that it can only engage objects geometrically shaped to fit a long thin magnetic engaging surface. In U.S. Pat. No. 3,827,021, a wall mounted magnet gripping fixture also attempts to reduce flux leakage due to large ferromagnetic object engagement. The method used in this patent provides two long bar magnets with poles of the same polarity facing each other so that when an object was engaged the fields of the two magnets would not interact to reduce the overall holding power. This application was limited in that the two long bar magnets provided a limited engaging surface hence limiting the sizes and shapes of ferromagnetic objects which could be engaged.

An element desirable in magnetic tool holders is a flat magnetic engaging surface. A flat engaging surface allows non-symmetric placement of metal objects of various sizes and shapes. Of the referenced patents, only the magnetic surface plate of U.S. Pat. No. 3,110,847 provides a flat magnetic engaging surface. However due to the single dipole magnetic field, the U.S. Pat. No. 3,110,847 magnetic surface plate is limited in the size of the metal objects it can engage. As previously described, large objects will weaken the field in adjacent areas, hence limiting the value of the flat engaging surface.

Since work with tools and other metal objects can be expected to occur in a multitude of locations, it is desirable that a tool holder be capable of being placed in any convenient location, regardless of how temporary. An example would be the ability to hang the tool holder on the inside of an open automobile hood during engine repairs. While some of the previously suggested magnetic object holders were capable of permanent mounting on a wall, none could be temporarily hung in various convenient work locations. It is also desirable that magnetic object holders have handles for ease of carrying to various work sites. None of the previously suggested magnetic object holders contains a handle.

There exists a need for a portable magnetic tool and object holder that is not susceptible to the flux reduction of a single dipole magnetic field; that has a flat magnetic engaging surface; and that can be hung or mounted in various convenient, albeit temporary, locations.

SUMMARY OF THE INVENTION

In view of the foregoing disadvantages inherent in the known types of devices now present in the prior art, the present invention provides an improved magnetic tool and object holder. As such, the general purpose of the present invention, which will be described subsequently in greater detail, is to provide a new and improved magnetic tool and object holder for holding iron based metal tools and parts. To attain this, the present invention provides a casing with multiple bar magnets attached to the inner side of a casing back panel. A non-magnetic cover encloses the magnets in the casing and provides a flat surface for engaging tools and other objects. The casing has handles on the casing side panels to permit easy carrying and a means for hanging the casing in a variety of work locations.

The present invention provides a magnetic holder which can hold multiple metal objects of various sizes and shapes without any worry of the magnetic flux being locally reduced due to engagement of a large metal object. Large metal objects are less likely to become magnetized due to the unique method of mixing oppositely poled magnets under the magnetic engaging surface. The present invention ensures various size and shape objects can be held due to the flat magnetic engaging surface. The handles permit mobility and also convenient placement of the present invention at a work site, such as under an open automobile hood.

The present invention is a light weight magnetic tool and object holder that is portable and can easily be hung in convenient locations via its handles. The multiple bar magnets are uniquely positioned such that a single dipole can not develop within the entire tool holder. Hence, a large metal object positioned on one location of the engaging face can not reduce the magnetic flux in adjacent locations on the engaging face. The present invention has a flat magnetic engaging face that allows for non-symmetric placement of metal objects of various shapes and sizes.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
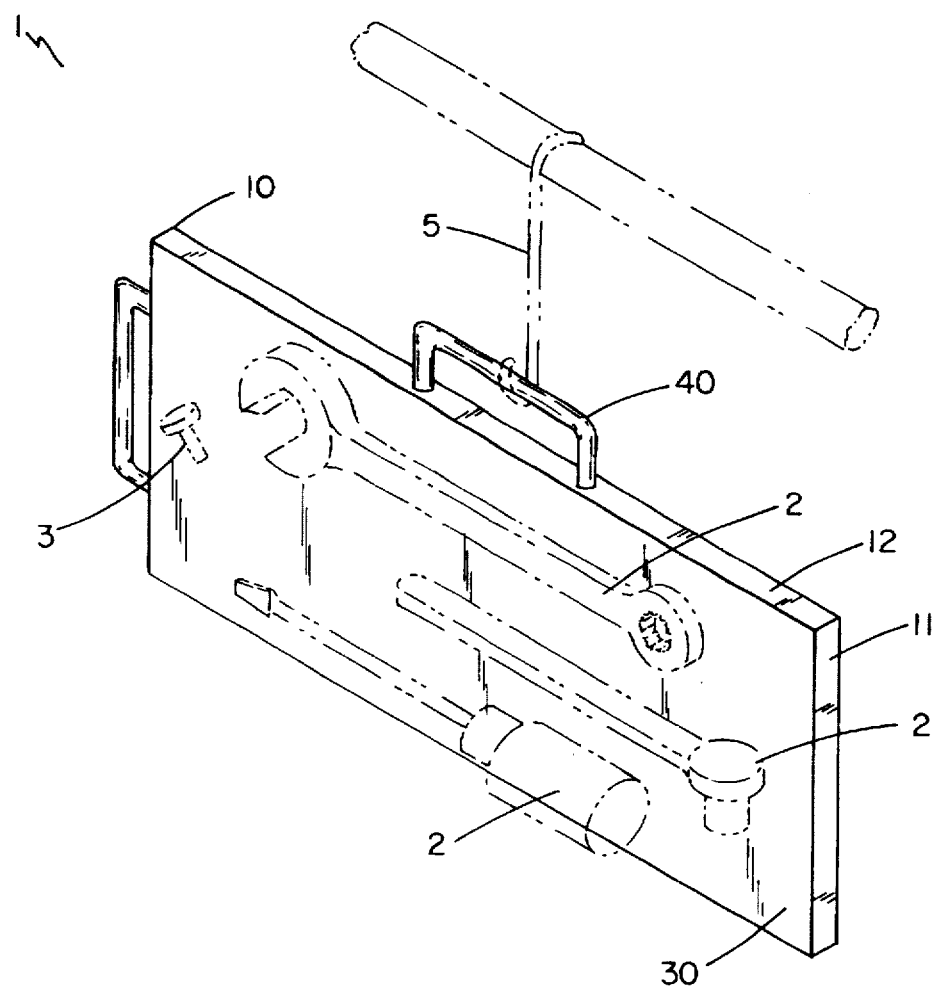
FIG. 1 is a front perspective view of the instant invention magnetic tool and object holder in a generally horizontal orientation.
Figure 2:
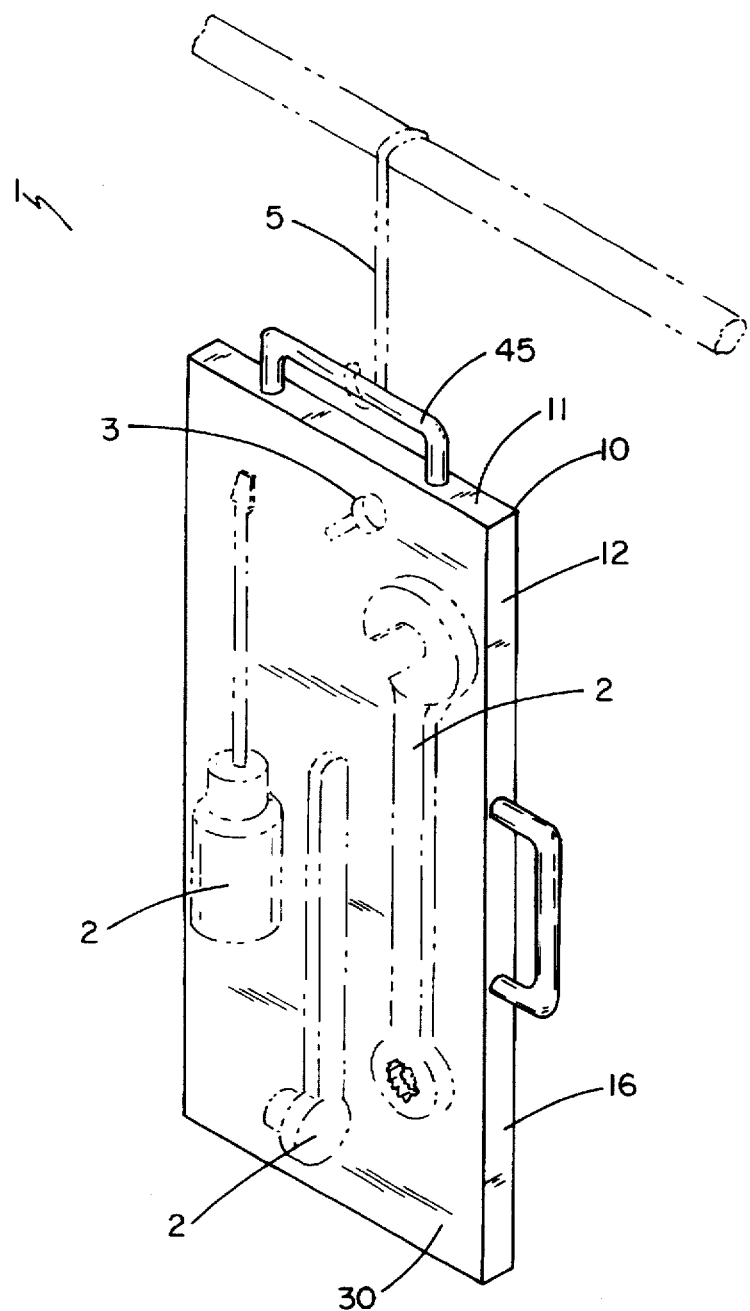
FIG. 2 is a front perspective view of the holder of FIG. 1 in a generally vertical orientation.
Figure 3:
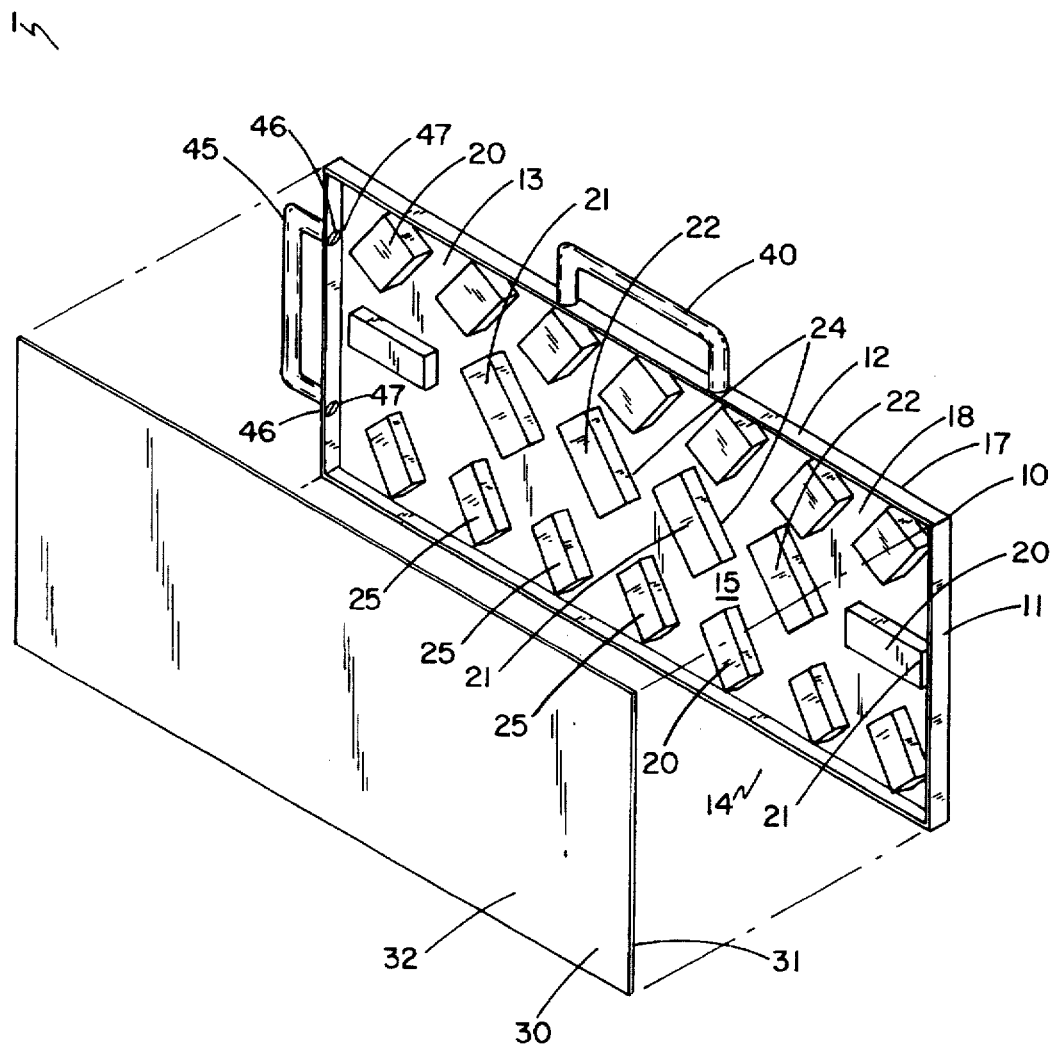
FIG. 3 is a front perspective view of the holder of FIG. 1 with the casing cover removed.

Referring to the drawings in detail wherein like elements are indicated by like numerals, there is shown an embodiment of the invention 1 incorporating a magnetic tool and object holder. The holder 1 is comprised of a casing 10, twenty bar magnets 20 within the casing 10, a casing cover 30 attached to said casing 10 and enclosing said magnets 20 within said casing 10, and two casing handles 40 and 45 attached to the casing 10. The holder 1 can be used to hold a wide variety of tools 2, such as pipe wrenches, screw drivers, scissors, etc., and objects 3, such as screws, cans, spark plugs, etc. The holder 1 can be hung in a convenient work location by means of a hook 5 engaging one of the handles 40, 45.

The casing 10 in this embodiment of the invention is made from sheet metal. The casing 10 has a relatively thin, rigid, rectangularly shaped, box-like configuration, with two short sides 11, two long sides 12, an enclosed back surface panel side 13, an open front surface panel side 14, an interior 15, and an exterior 16. The back surface panel side 13 has an exterior surface 17 and an interior surface 18.

The bar magnets 20 are relatively flat, rectangular-shaped and made from a permanent magnetized material. Each bar magnet 20 has a north pole flat face 21 and a south pole flat face 22. As described in detail below, one of said faces 21, 22 is attached to the back surface panel interior surface 18 and is also designated the attached face 24 and the other, unattached face is also referred to as 25. The bar magnet height or distance between the north and south flat faces 21 and 22 will be identical to the width of the long sides 12 and short sides 11 between the back surface panel 13 and open front surface panel 14. The bar magnets 20 are held to the back surface panel interior surface 18 by magnetic force. Glue is also applied between the bar magnets 20 and back surface panel interior surface 18 to prevent lateral movement. Approximately one half of the bar magnets 20 have their north pole flat faces 21 attached to the back surface panel interior surface 18. The bar magnets 20 which have their north pole flat face 21 attached to the back surface panel interior surface 18 are dispersed over the back surface panel interior surface 18. The remaining bar magnets 20 have their south pole flat faces 22 attached to the back surface panel interior surface 18. The bar magnets 20 which have their south pole flat face 22 attached to the back surface panel interior surface 18 are interspersed around the bar magnets 20 with their north pole flat face 21 attached to the back surface panel interior surface 18. Each bar magnet 20 is sufficiently spaced from the adjacent bar magnets 20 such that the individual fields do not interact when a large ferromagnetic tool 2 or object 3 is engaged to the holder 1. This distance ensures there is no magnetic flux reduction in adjacent engagement areas. Smaller metal tools or objects may still be engaged or will remain engaged. Also large ferromagnetic objects will tend to not become magnetized due to engagement via adjacent bar magnets 20 with opposite polarities. The bar magnets 20 are made of a permanent magnetic material such as alnico.

The casing cover 30 is flat, is made of a thin non-magnetic material, is equal in surface dimension to the back surface panel 13 and is fixedly attached over the open front surface panel side 14. The casing cover 30 is sized to close the casing 10 open front surface panel side 14 and to completely enclose the bar magnets 20 within the casing 10. The casing cover 30 is attached to the casing 10 with a glue or epoxy. The glue or epoxy holds the casing cover inner surface 31 against the unattached faces 24 of the bar magnets 20. The glue of epoxy also seals the casing cover 30 against the open front surface panel side 14. The casing cover exterior surface 32 provides a flat magnetic engaging surface. Since the casing cover 30 is comprised of a non-magnetic material, such as plexiglass or fiber glass, the magnetic force exerted through the casing cover 30 is stronger than the magnetic force exerted through the casing metallic back surface panel 13.

In this embodiment of the invention 1 a handle 40 is fixedly attached to a casing long side 12 and a handle 45 is attached to a casing short side 11. The long side handle 40 and the short side handle 45 are identical and are made of rounded light weight material and are shaped like an open sided rectangle. One long side 12 has two holes (not shown) drilled at equal distances from the center of the long side 12. The distance between the holes is equal to the distance from the center line of one end of a handle to the center line of the other end of a handle. Handle screws (not shown) pass through these holes from the casing interior 15 to attach the long side handle 45 to the long side 12. One short side 11 has two holes 46 drilled at equal distances from the center of the width side panel 11. The distance between the holes 46 is equal to the distance from the center line of one end of a handle to the center line of the other end of a handle. Handle screws 47 pass through these holes 46 from the casing interior 15 to attach the short side handle 45 to the short side 11. Other combinations of handles and sides may be used in other embodiments of the invention. The casing handles 40, 45 are made of a metallic material with a rubber coating.

In the preferred embodiment the casing 10 is made from a single piece of sheet metal. The long sides 12 and the short sides 11 are approximately 0.387 inches from back surface panel side 13 to open front surface panel side 14. The back surface panel 13 and casing cover 30 are each 15 inches long and 7 inches wide. There are 18 to 20 bar magnets 20 made of alnico. The bar magnets 20 are each 1.75 inches long, 0.875 inches wide and 0.387 inches thick. The bar magnets 20 are arranged in three rows along the back surface panel interior surface 18, each row having a general longitudinal axis parallel to the casing long sides 12. No bar magnet 20 is closer than 0.75 inches to an adjacent bar magnet 20. This has proved to be a sufficient distance to minimize interaction between the fields of the individual magnets. The bar magnets 20 in each row are generally positioned so that their individual longitudinal axes are at a 45 degree angle to the general longitudinal axes of the rows.

In use a hook 5 can be used to engage one of the casing handles 40, 45 to hang the holder 1 from a desired location in a work area. Ferromagnetic tools 2 and objects 3, such as a pipe wrench, a screw driver, screws, scissors, and the like, can be placed against the casing cover 30 and/or the casing back surface panel side exterior surface 17. Due to the flat magnetic engaging surfaces provided by the casing cover 30 and casing back surface panel side exterior surface 17 a wide variety of tools 2 and objects 3 can be engaged. The matrix of bar magnets 20 within the casing 10 permit tool and object engagement without flux reduction in adjacent surface areas.

It is understood that the above-described embodiment is merely illustrative of the application. Other embodiments may be readily devised by those skilled in the art which will embody the principles of the invention and fall within the spirit and scope thereof.

I claim:

1. A magnetic tool and object holder for holding ferromagnetic objects in a known convenient location, comprising:

a metallic casing having a relatively thin, rigid, rectangularly shaped, box-like configuration, with two short sides, two long sides, an enclosed back surface panel side, an open front surface panel side, an interior, and an exterior, said back surface panel side having an exterior surface and an interior surface;

a plurality of bar magnets within said casing, each said bar magnet being relatively flat, rectangular-shaped and made from a permanent magnetized material, each said bar magnet having a north pole flat face and an opposite south pole flat face, one of each said bar magnet flat faces being attached to said back surface panel interior surface by magnetic force and glue, wherein a bar magnet height defined as the distance between the north and south flat faces is identical to a width of the long sides and short sides between the back surface panel and open front surface panel, wherein one half of the plurality of bar magnets have their north pole flat faces attached to said back surface panel interior surface and the remainder of said plurality of bar magnets have their south pole flat faces attached to the back surface panel interior surface, said bar magnets having their north pole flat faces attached to the back surface panel interior surface and being dispersed over the back surface panel interior surface, said bar magnets having their south pole flat face attached to the back surface panel interior surface and being interspersed around the bar magnets with their north pole flat face attached to the back surface panel interior surface, said plurality of bar magnets being arranged in three rows of bar magnets along said back surface panel interior surface, each row having a general longitudinal axis parallel to the casing long sides, said bar magnets in each row being generally positioned so that each bar magnet's individual longitudinal axis is at a 45 degree angle to the general longitudinal axes of the rows;

a casing cover attached to said casing and enclosing said plurality of bar magnets within said casing, said casing cover being flat and comprised of a thin non-magnetic material, said casing cover having a surface dimension equal to the back surface panel side, said casino cover being fixedly attached over the open front surface panel side, said casing cover being adapted to fit against those bar magnet faces opposed to said attacked bar magnet faces; and two casing handles attached to said casing, one said casing handle being fixedly attached to a casing to a casing short side.

2. A holder as recited in claim 1, further comprising:

a hook adapted to engage one of said handles.

3. A holder as recited in claim 2, wherein:

said metallic casing is made from sheet metal.

4. A holder as recited in claim 3, wherein:

said the casing cover is comprised of plexiglass.

5. A holder as recited in claim 3, wherein:

said the casing cover is comprised of fiber glass.

\* \* \* \* \*